United States Patent
Nishimori et al.

(10) Patent No.: US 9,746,755 B2
(45) Date of Patent: Aug. 29, 2017

(54) LIGHT SOURCE DEVICE AND IMAGE PROJECTOR INCLUDING THE SAME

(71) Applicants: Takehiro Nishimori, Kanagawa (JP);
Kazuhiro Fujita, Tokyo (JP);
Toshiharu Murai, Kanagawa (JP);
Tatsuya Takahashi, Tokyo (JP);
Takahiro Kado, Kanagawa (JP)

(72) Inventors: Takehiro Nishimori, Kanagawa (JP);
Kazuhiro Fujita, Tokyo (JP);
Toshiharu Murai, Kanagawa (JP);
Tatsuya Takahashi, Tokyo (JP);
Takahiro Kado, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/873,663

(22) Filed: Oct. 2, 2015

(65) Prior Publication Data
US 2016/0103387 A1 Apr. 14, 2016

(30) Foreign Application Priority Data
Oct. 10, 2014 (JP) ................................. 2014-209010

(51) Int. Cl.
*F21V 29/00* (2015.01)
*G03B 21/16* (2006.01)
(Continued)

(52) U.S. Cl.
CPC .............. *G03B 21/16* (2013.01); *F21V 3/049* (2013.01); *F21V 7/00* (2013.01); *F21V 29/505* (2015.01); *F21V 29/506* (2015.01); *F21V 29/60* (2015.01); *G03B 21/005* (2013.01);
*G03B 21/2033* (2013.01); *G03B 21/2053* (2013.01); *G03B 21/2066* (2013.01); *F21Y 2115/10* (2016.08); *F21Y 2115/30* (2016.08)

(58) Field of Classification Search
CPC .......... G03B 21/16; F21V 29/00; F21V 29/02
USPC ....................................... 353/52, 57
See application file for complete search history.

(56) References Cited

U.S. PATENT DOCUMENTS

2004/0125348 A1* 7/2004 Carkner ................. G03B 21/30
353/119
2006/0158725 A1 7/2006 Yamamoto et al.
(Continued)

FOREIGN PATENT DOCUMENTS

CN 1799002 A 7/2006
CN 101359076 A 2/2009
(Continued)

OTHER PUBLICATIONS

Extended European Search Report dated Feb. 24, 2016 issued in corresponding European Application No. 15188916.9.
(Continued)

*Primary Examiner* — William C Dowling
(74) *Attorney, Agent, or Firm* — Harness, Dickey & Pierce, P.L.C.

(57) ABSTRACT

A light source device includes a light source section that emits laser light, a reflection and diffusion member that diffuses and reflects the laser light emitted from the light source section, and a cooler that cools the reflection and diffusion member. The cooler includes at least one of an axial fan, an electronic cooling element, and a heat pipe.

16 Claims, 7 Drawing Sheets

(51) Int. Cl.
*F21V 3/04* (2006.01)
*F21V 7/00* (2006.01)
*F21V 29/505* (2015.01)
*F21V 29/506* (2015.01)
*F21V 29/60* (2015.01)
*G03B 21/20* (2006.01)
*G03B 21/00* (2006.01)
*F21Y 115/30* (2016.01)
*F21Y 115/10* (2016.01)

(56) References Cited

U.S. PATENT DOCUMENTS

| | | |
|---|---|---|
| 2007/0040991 A1 | 2/2007 | Lee |
| 2009/0034105 A1 | 2/2009 | Ho |
| 2010/0245776 A1 | 9/2010 | Yamamoto |
| 2011/0122493 A1 | 5/2011 | Ogawa et al. |
| 2011/0194038 A1 | 8/2011 | Kimura et al. |
| 2012/0182527 A1 | 7/2012 | Enomoto et al. |
| 2013/0169795 A1* | 7/2013 | Hayashi ............ H05B 37/02 348/131 |
| 2013/0242232 A1 | 9/2013 | Kimura et al. |
| 2013/0308104 A1 | 11/2013 | Nishimori et al. |
| 2014/0028983 A1 | 1/2014 | Fujita et al. |
| 2014/0036241 A1 | 2/2014 | Nishimori et al. |
| 2014/0043589 A1 | 2/2014 | Chifu et al. |
| 2014/0049755 A1 | 2/2014 | Nishimori et al. |
| 2014/0071407 A1 | 3/2014 | Takahashi et al. |
| 2014/0071408 A1 | 3/2014 | Takahashi et al. |
| 2014/0198301 A1 | 7/2014 | Yagyu et al. |
| 2014/0240679 A1 | 8/2014 | Nishimori et al. |
| 2014/0240680 A1 | 8/2014 | Nishimori et al. |
| 2014/0268068 A1 | 9/2014 | Takahashi et al. |
| 2014/0268069 A1 | 9/2014 | Takahashi et al. |
| 2014/0268072 A1 | 9/2014 | Takahashi et al. |
| 2015/0042963 A1 | 2/2015 | Nishimori et al. |

FOREIGN PATENT DOCUMENTS

| | | |
|---|---|---|
| CN | 102147561 A | 8/2011 |
| CN | 102365583 A | 2/2012 |
| JP | 2010-231063 | 10/2010 |
| JP | 2014-56812 | 3/2014 |
| JP | 2014-149513 | 8/2014 |

OTHER PUBLICATIONS

Chinese Office Action dated Nov. 2, 2016 issued in corresponding Chinese Application No. 201510654349.1 (with English translation).

Chinese Office Action dated Apr. 5, 2017 issued in corresponding Chinese Application No. 201510654349.1 (with English translation).

* cited by examiner

LIGHT SOURCE DEVICE AND IMAGE PROJECTOR INCLUDING THE SAME

CROSS-REFERENCE TO RELATED APPLICATION

This application is based upon and claims the benefit of priority to Japanese Patent Application No. 2014-209010 filed on Oct. 10, 2014, the entire disclosures of which are incorporated herein by reference.

BACKGROUND

Technical Field

The present invention relates to a light source device using laser light and an image projector including the light source device.

Description of Related Art

Nowadays, an image projector that projects on a screen an image using image data stored in a screen, a video image, and a memory card and so on of a personal computer is conventionally known. The image projector is configured to project the image on the screen by light emitted from a light source device by use of a micro mirror display element, a liquid crystal plate, and so on, referred to as a DMD (digital micro mirror device).

In recent years, the light source device of the image projector employs as a light source a light-emitting diode (LED), a laser diode (LD), and a semi-conductor element such as organic EL (electroluminescence) and so on.

By the way, laser light is coherent light having an aligned wave surface and great straightness. Therefore, there is possibility that, if the laser light directly enters eyes of a person, it gives an obstacle to retina. In addition, because the laser light has great energy strength, there is possibility that, when the laser light is irradiated to the skin of a person, it affects on a human body.

Therefore, there is known a technology in which a diffusion member to relieve energy density of laser light of a high output is provided on a traveling light path of the laser light such that the laser light is directly emitted to an exterior of the image projector to contribute to the improvement in safety for the laser light in the light source device of the image projector including the laser light source (see Japanese Patent Application Publication No. 2010-231063).

If the laser light of a high output continues to be irradiated to the diffusion member made of glass, the diffusion member tends to generate heat breaking and damage. In other words, because glass has a very small heat conductivity, expansion force is locally added to a heated portion only by the irradiation of the laser light. As a result, a difference in thermal stress between the heated portion and a periphery of the heated portion occurs, and the heat breaking occurs in the diffusion member when the difference in thermal stress exceeds a breaking limit of glass.

It is important not to break the diffusion member to prevent the laser light from leaking directly to an exterior of the image projector without the laser light being diffused.

However, a technology disclosed in Japanese Patent Application Publication No. 2010-231063 as described above premises that the laser light is not leaked to an exterior if the diffusion member departs from the traveling light path of the laser light. The technology does not consider a case where the diffusion member does not exist in a normal state in the travelling light path of the laser light by breaking a part of the diffusion member even if the diffusion member does not depart from the travelling light path of the laser light. Therefore, it is necessary to contemplate further improvement in safety for the laser light.

SUMMARY

An object of the present invention is to provide a light source device capable of preventing laser light of a high output from leaking to an exterior of an image projector without diffusing the laser light by reducing heat quantity that a diffusion member receives and suppressing damage of the diffusion member by thermal stress.

To accomplish the above object, a light source device according to an embodiment of the present invention includes a light source part that emits laser light, a reflection and diffusion member that diffuses and reflects the laser light emitted from the light source device, and a cooler that cools the reflection and diffusion member.

DETAILED DESCRIPTION

Embodiments according to the present invention will be described hereinafter with reference to the accompanying drawings.

Embodiment 1

A first embodiment is an example of a light source device according to the present invention, as shown in FIGS. 1 to 4. The light source device includes a light source section that emits laser light, a reflection and diffusion member that reflects and diffuses the laser light emitted from the light source device, and a cooler that cools the reflection and diffusion member.

Figure 1:
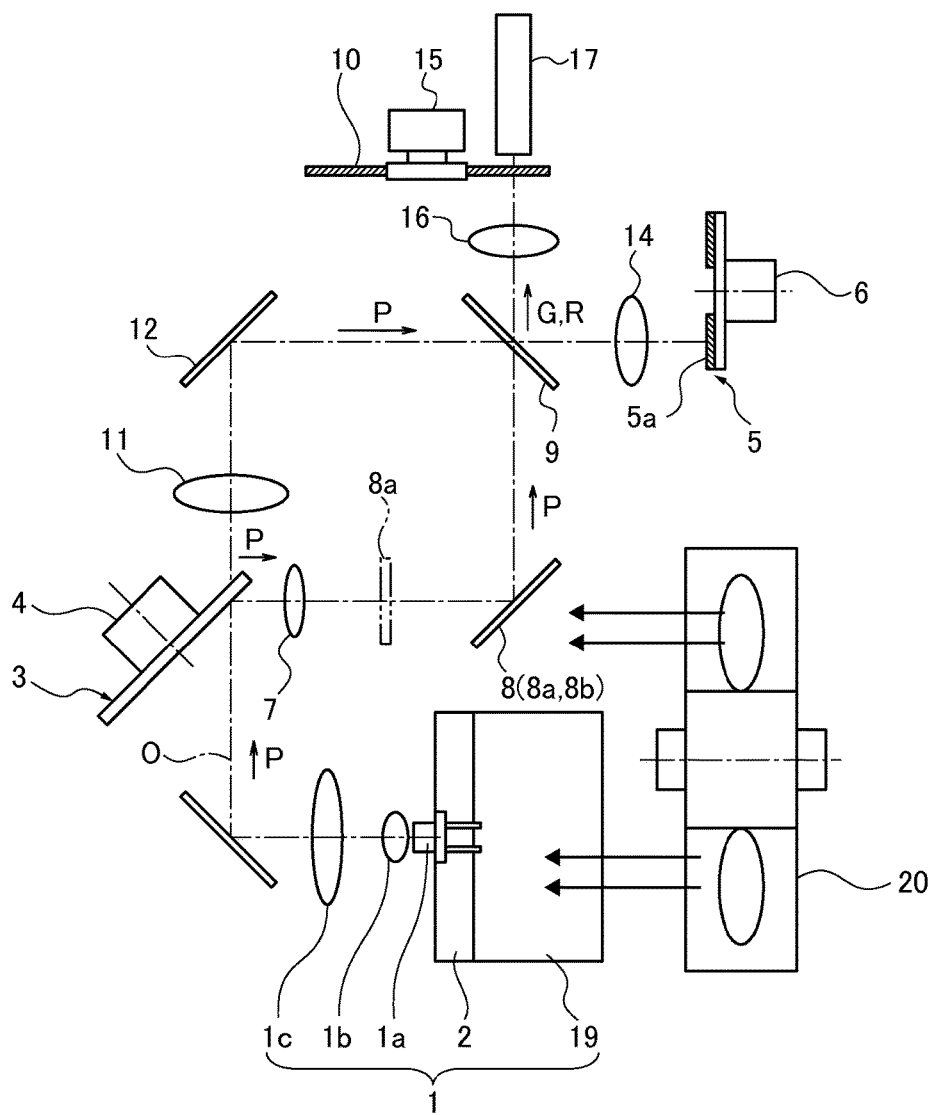
FIG. 1 is an optical diaphragm showing a main configuration of a light source device according to Embodiment 1 of the present invention.

FIG. 1 is an optical diaphragm showing a main part of the light source device according to the present invention. The light source device 1 is mainly composed of a laser diode (LD) 1a as a light source that emits laser light, a coupling lens 1b, a first condenser lens 1c, a laser diode holder 2, and a heatsink (heat releasing plate) 19. Note that, as other example, the heatsink (heat releasing plate) 19 may not be provided on the light source section.

The laser diode 1a is provided on the laser diode holder 2. The coupling lens 1b is provided on a front surface side of the laser diode holder 2 to face the laser diode 1a. The heatsink 19 to release heat generated in the laser diode 1a which is the light source is provided on a back surface side of the laser diode holder 2. The heatsink 19 is formed by a metal having good heat conductivity such as aluminum, copper and so on.

The laser light P emitted from the laser diode 1a is condensed by the coupling lens 1b and guided to the first condenser lens 1c as a parallel luminous flux. The first condenser lens 1c carries out to condense the laser light P formed as the parallel luminous flux by the coupling lens 1b.

Here, although it is described that the laser diode 1a is configured to emit laser light P of blue ingredient in the example, a laser diode emitting laser light of blue ingredient or red ingredient may be used. In addition, at least one LED (light-emitting diode) may be used instead of the laser diode. Although the example is described by use of the single laser diode 1a and the single coupling lens 1b, a plurality of laser diodes and a plurality of coupling lenses may be used as required.

The laser light P of blue ingredient is guided to a light-path switching disc 3 as a light-path switching section. The laser light P is formed in a spot-like shape in the light-path switching disc 3. The spot-like shape of the laser light P is set to have a suitably optimum size to prevent color from mixing and so on.

Figure 2:
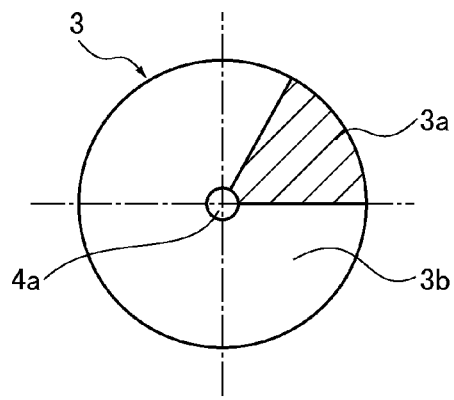
FIG. 2 is a plan view of a light-path switching disc of the light source device shown in FIG. 1.

The light-path switching disc 3 is composed of a light-path time dividing rotation disc including a reflection area 3a and a transmission area 3b which are divided in a rotation direction, as shown in FIG. 2. The light-path switching disc 3 is obliquely disposed relative to an optical axis O of the first condenser lens 1c (45 degrees relative to the optical axis in the example).

The light-path switching disc 3 is rotatably driven by a first stepping motor 4 as a drive source. Here, reference number 4a in FIG. 2 shows a drive shaft of the first stepping motor 4.

The reflection area 3a of the light-path switching disc 3 includes a reflection film provided to reflect the laser light P of blue ingredient. On the other hand, the transmission area 3b of the light-path switching disc 3 includes an antireflection film provided to transmit the laser light P of blue ingredient without reflecting (see FIG. 2).

A third condenser lens 11, a light-path folding mirror 12, a light-path composite optical element 9, a fourth condenser lens 14, and a phosphor wheel 5 are provided on an advancing light path or second light path on which the laser light P of blue ingredient that transmits the transmission area 3b advances (see FIG. 2).

The third condenser lens 11 condenses the laser light P of blue ingredient formed in the spot-like shape by the transmission area 3b and the first condenser lens 1c to convert it into a parallel luminous flux. The condensed laser light P of blue ingredient is reflected on the light-path folding mirror 12 toward the light-path composite optical element 9 (see FIG. 1).

The light-path composite optical element 9 is composed of, for example, a dichroic mirror. The dichroic mirror transmits the laser light P of blue ingredient and has an optical characteristic that reflects green color fluorescence G (hereinafter, referred to as fluorescence G) and red color fluorescence R (hereinafter, referred to as fluorescence R) which are described below. The dichroic mirror functions to combine optical paths of the laser light P of blue ingredient, and the fluorescence G and the fluorescence R.

The phosphor wheel 5 is composed of a rotation disc and rotatably driven by a second stepping motor 6 shown in FIG. 1. A ring-shaped fluorescence film 5a is formed on the phosphor wheel 5 along a peripheral direction of the phosphor wheel. A mixing material (material generating yellow fluorescence) of fluorescence materials (generating the fluorescence G and the fluorescence R by the excitation of the laser light P of blue ingredient) is used for the fluorescence film 5a. However, the phosphor wheel is not limited to this material. For example, a fluorescence material having a fluorescence distribution characteristic extending from a wavelength region of green ingredient to a wavelength region of red ingredient may be used.

The laser light P of blue ingredient that transmits the light-path composite optical element 9 is condensed by a fourth condenser lens 14 to be irradiated to the fluorescence film 5a in a spot like shape. The fluorescence film 5a is excited by the laser light P to generate the fluorescence G and the fluorescence R.

As shown in FIG. 1, the fluorescence G, the fluorescence R, and a part of the laser light P reflected on the fluorescence film 5a are condensed by the fourth condenser lens 14 to be a parallel luminous flux, and thereafter are guided to the light-path composite optical element 9 again. The fluorescence G and the fluorescence R are reflected on the light-path composite optical element 9 to be guided to a fifth condenser lens 16. The part of the laser light P reflected on the fluorescence film 5a transmits the light-path composite optical element 9 to be guided to the light-path folding mirror 12.

Note that the deterioration of the fluorescence film 5a is restrained because a position of the fluorescence film 5a where the laser light P is irradiated changes every hour by the rotation of the phosphor wheel 5. When the laser light is irradiated to the fluorescence film 5a, the laser light P is scattered on the phosphor wheel 5 not to be the coherent light. Therefore, as long as the laser light P is irradiated to the fluorescence film 5a, there is no trouble in contemplating safety for human eye.

A color ingredient switching disc 10 is provided in an advancing light-path on which the fluorescence G and the fluorescence R condensed by the fifth condenser lens 16 advance (see FIG. 1). The color ingredient switching disc 10 is rotatably driven by a third stepping motor 15.

Figure 3:
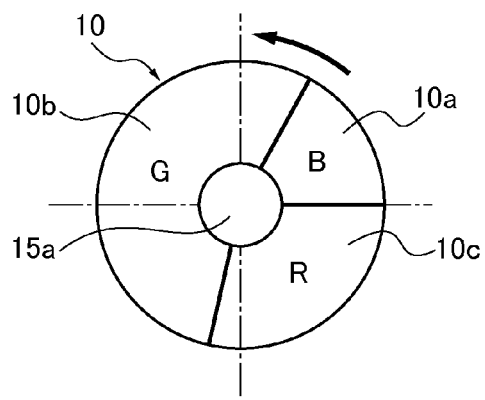
FIG. 3 is a plan view of a color ingredient switching disc of the light source device shown in FIG. 1.

The color ingredient switching disc 10 is composed of a color ingredient time dividing rotation disc including a first fan-shaped area 10a, a second fan-shaped area 10b, and a third fan-shaped area 10c which are formed to be peripherally divided, as shown in FIG. 3. The first fan-shaped area 10a transmits the laser light P of blue ingredient in a rotation direction, the second fan-shaped area 10b transmits the green fluorescence and absorbs or reflects the red fluorescence, and the third fan-shaped area 10c transmits the red fluorescence and absorbs or reflects the green fluorescence. Here, reference number 15a in FIG. 3 shows a drive shaft of the third stepping motor 15.

The fluorescence G and the fluorescence R reflected on the light-path composite optical element 9 and the laser light P of blue ingredient that transmits the light-path composite optical element 9 are condensed by the fifth condenser lens 16, pass respectively through the first to third fan-shaped areas 10a, 10b, and 10c of the color ingredient switching disc 10, and are guided to a light tunnel 17. The light tunnel 17 is a member that reduces unevenness of light quantity and equalizes the light quantity. Note that a fly-eye lens may be used instead of the light tunnel 17.

The fan-shaped area 10a which is a transmitting area of the laser light P of the color ingredient switching disc 10 may be composed of, for example, a transparent glass or cutout portion, or filter transmitting only a wavelength band of blue ingredient.

A second condenser lens 7 and a reflection and diffusion member are provided on an advancing light-path (first light-path) on which the laser light P of blue light reflected on the reflection area 3a of the light-path switching disc 3 advances. The second condenser lens 7 functions to convert the laser light P of blue ingredient reflected on the light-path switching disc 3 into a parallel luminous flux and to guide it to the reflection and diffusion member 8.

Here, the reflection and diffusion member 8 includes a reflection member 8b and a diffusion member 8a which are arranged integrally or close to each other on the same optical axis. As one example of the reflection and diffusion member 8, in the embodiment, the diffusion member 8a and the reflection member 8b are integrally formed. As another example, the diffusion member 8a as shown by double-dashed line in FIG. 1 may be separated from and provided close to the reflection member 8b on the same optical axis between the second condenser lens 7 and the reflection member 8b.

Figure 4:
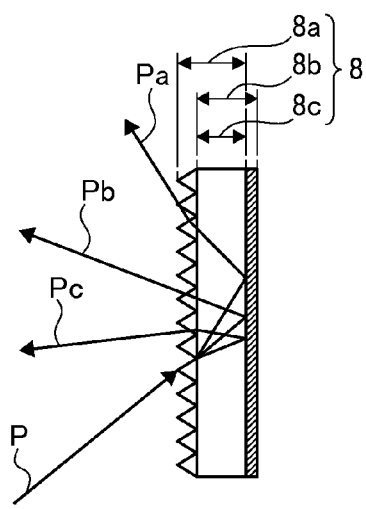
FIG. 4 is a schematic view of a reflection and diffusion member of the light source device shown in FIG. 1.

In FIG. 4, the diffusion member 8a and the reflection member 8b of the reflection and diffusion member 8 are integrally formed. The reflection and diffusion member 8 includes a base part 8c which is made of a transparent member such as polycarbonate resin, polystyrene resin or polymethylmethacrylate resin. The diffusion member 8a is formed by the base part 8c and a diffusion surface, and the reflection member 8b is formed by the base part 8c and a reflection surface.

The diffusion member 8a is provided on a surface side of the reflection and diffusion member 8, on which the laser light P strikes. A diffusion surface is formed on a surface of the diffusion member 8a. Note that an antireflection film is provided on an incident side of the diffusion member 8a where the laser light P enters. The diffusion member 8a diffuses the laser light P and is used to remove coherent property.

The laser light P is diffused on the surface of the diffusion member 8a of the reflection and diffusion member 8, transmits the diffusion member 8a to be diffusion light Pa, Pb, and Pc in the base part 8c, thereafter, is reflected on the reflection surface of the reflection member 8b, and further diffused in transmitting the base part 8c again (see FIG. 4). In this way, because diffusion shaping of the laser light P is executed twice, diffusion performance can be enhanced, compared with a case where the laser light transmits the reflection and diffusion member 8 only one time. Meanwhile, in the case where the diffusion member 8a and the reflection member 8b are separated as shown by double-dashed line in FIG. 1, even if the diffusion shaping of the laser light P is one time, the reflection and diffusion member has the diffusion property.

The laser light P of blue ingredient reflected on the reflection and diffusion member 8 is guided to the light-path composite element 9 (see FIG. 1).

The laser light P of blue ingredient that transmits the light-path composite element 9 is condensed by the fifth condenser lens 16 as mentioned above and transmits the fan-shaped area 10a of the color ingredient switching disc 10, and thereafter is guided to the light tunnel 17 (see FIG. 1).

The light tunnel 17 has advantageous effect reducing variation in light quantity. In the example, if the advantageous effect is acquired, a substitute can be used for the light tunnel. For example, a fly-eye lens may be used instead of the light tunnel.

An axial fan 20 which is a blower as one example of the cooler is provided close to the heatsink 19 which is a heating plate (see FIG. 1).

The blower according to the first embodiment is configured such that cooling air impinges on one of the light source section and the reflection and diffusion member to the other, or simultaneously on them. As one example, in the first embodiment, cooling air exhausted from the axial fan 20 is fed from one of the heatsink 19 and the reflection and diffusion member 8 to the other, or simultaneously to both the heatsink 19 and the reflection and diffusion member 8. Here, in FIG. 1, arrows show directions of the air directing from the axial fan 20 to the heatsink 19 and the reflection and diffusion member 8. Note that, in a case where the heatsink 19 is not used as the light source section 1, the cooling air is simultaneously fed to both the laser diode 1a and the reflection and diffusion member 8.

As an alternative, the cooling air exhausted from the axial fan 20 may be fed from one of the heatsink 19 and the reflection and diffusion member 8 to the other, because it is sufficient to take heat generated in the laser diode 1a and heat generated in the reflection and diffusion member 8 simultaneously. In a case where the heatsink 19 is not used as the light source section 1, the cooling air may be fed from one of the laser diode 1a and the reflection and diffusion member 8 to the other. Note that, the cooler according to the first embodiment may be disposed to perform directly cooling operation to the diffusion member 8a.

In this way, the configuration of the axial fan 20 makes it possible to take the heat generated in the laser diode 1a and the heat generated in the reflection and diffusion member 8 simultaneously and hence to cool efficiently them, and to prevent the increases in size, cost and noise of the light source device.

By guiding cooling air to the reflection and diffusion member 8, it is possible to reduce a difference of temperature distribution in the reflection and diffusion member 8, suppress the occurrence of local thermal stress, and breakage due to heat cracking, even if the laser light emitted from the light source section 1 has a very high output. Because the reflection and diffusion member 8 is not broken, light is always diffused, and therefore it is possible to provide a safety light source device without directly leaking strong laser light to an exterior of the light source device.

In addition, the guide of the cooling air to the reflection and diffusion member 8 makes it possible to remove dust adhered to the reflection and diffusion member 8 to maintain optical performance.

Embodiment 2

Figure 5:
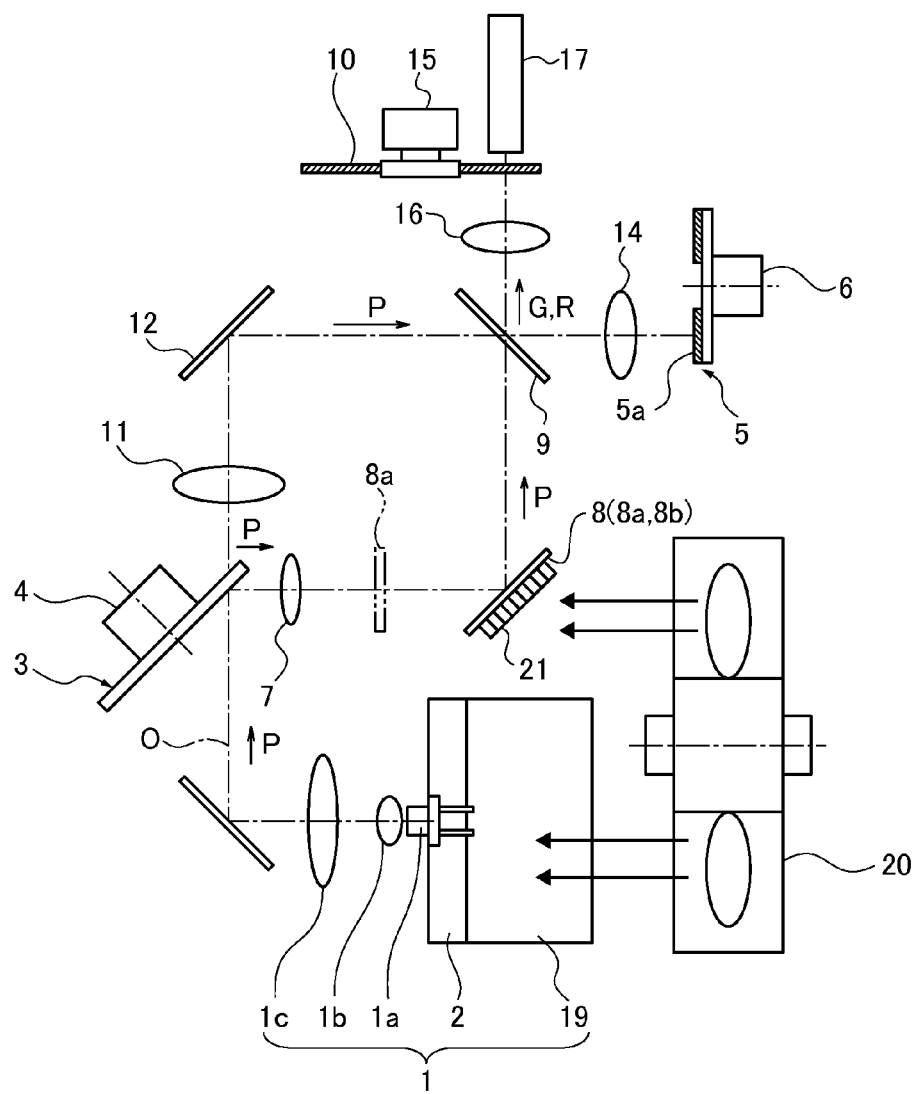
FIG. 5 is an optical diaphragm showing a main configuration of a light source device according to Embodiment 2 of the present invention.

FIG. 5 illustrates a light source device according to a second embodiment.

A cooler according to the second embodiment has a configuration in which at least either one of an electronic cooling element, a heat pipe, and a blower is provided, as one example. In FIG. 5, identical reference numbers are attached to similar parts to the parts shown in FIG. 1, and a detailed description thereof is omitted.

In the second embodiment, the electronic cooling element 21 as one example of the cooler is provided on the reflection member 8b of the reflection and diffusion member 8. Note that, in the case where the diffusion member 8a as shown by double-dashed line is separately provided on an optical path between the second condenser lens 7 and the reflection member 8b with respect to the reflection and diffusion member 8, the electronic cooling element 21 is disposed in contact with a periphery of out of the optical path to directly cool the diffusion member 8a. The electronic cooling element 21 is a semi-conductor element including two types of metal junctions and employing the Peltier effect in which, if a current is applied to a junction of two kinds of metals, endothermic occurs in one metal, and heat moves to the other metal to generate heat.

As the cooler, not only the electronic cooling element 21 cooling the reflection and diffusion member 8 is used, but also a combination of the axial fan 20 and the electronic cooling element 21 may be used. When cooling the electronic cooling element 21 by use of the axial fan 20, it is necessary to suitably optimize cooling performance of the axial fan 20 in accordance with heat quantity generated in the used electronic cooling element 21. If the electronic cooling element 21 is not sufficiently cooled, because the Peltier effect is not sufficiently acquired and the effect absorbing heat of the reflection and diffusion member 8 is reduced.

In this way, the provision of the electronic cooling element 21 makes it possible to maintain an inner side of the reflection and diffusion member 8 in a predetermined temperature, and therefore to cool the reflection and diffusion member safely even if the laser light of the strong output is emitted, and to prevent the reflection and diffusion member 8 from being broken. As a result, because light can be always diffused, it is possible to provide a safe light source device without leaking directly the strong laser light to an exterior of the light source device.

Embodiment 3

Figure 6:
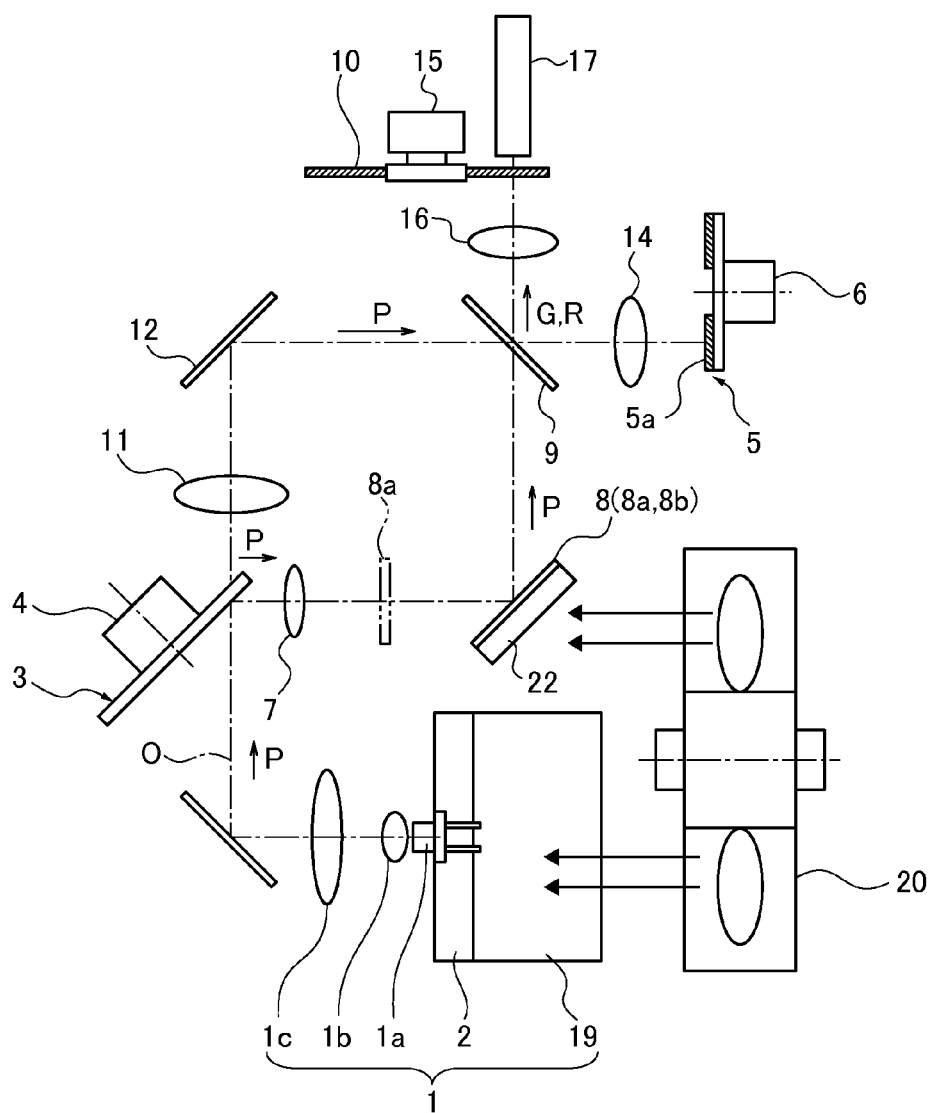
FIG. 6 is an optical diaphragm showing a main configuration of a light source device according to Embodiment 3 of the present invention.
Figure 7:
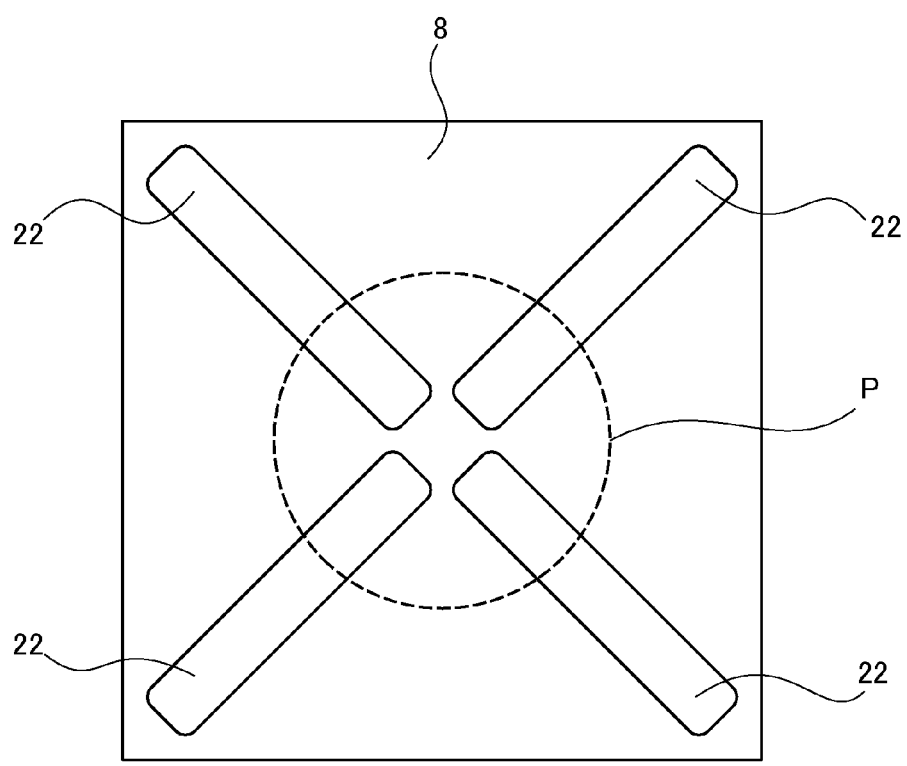
FIG. 7 is an enlarged view showing a reflection and diffusion member according to Embodiment 3 of the present invention.

FIGS. 6 and 7 illustrate a light source device according to a third embodiment.

A cooler according to the third embodiment has a configuration in which at least either one of an electronic cooling element, a heat pipe, and a blower is provided, as one example. In FIG. 6, identical reference numbers are attached to similar parts to the parts shown in FIG. 1, and a detailed description thereof is omitted.

In the third embodiment, the heat pipe 22 as one example of the cooler is provided on the reflection member 8b of the reflection and diffusion member 8. Note that, in the case where the diffusion member 8a as shown by double-dashed line is separately provided on the optical path between the second condenser lens 7 and the reflection member 8b without providing integrally the diffusion member 8a and the reflection member 8b with respect to the reflection and diffusion member 8, the heat pipe 22 is provided on a periphery of the reflection and diffusion member 8 to be capable of moving heat of the diffusion member 8a (see FIG. 6). As an alternative, the cooler may be not only the heat pipe, but also a combination of the electronic cooling element 21 or the axial fan 20 and the heat pipe 22.

The heat pipe 22 includes a pipe made of a material having a high heat conductivity and volatile liquid (hydraulic fluid) hermetically contained in the pipe. When heating one of the pipe and the liquid, the evaporation of the hydraulic liquid occurs by absorption of heat, and the heat moves to the other. Then, the heat is released to generate the condensation of the hydraulic liquid, thereby allowing the heat to move.

FIG. 7 illustrates the reflection and diffusion member 8. Four heat pipes 22 are shown in FIG. 7. The four heat pipes are radially arranged from close positions to a center point of the laser light P entering the reflection and diffusion member 8.

This provision of the heat pipes 22 makes it possible to generate high-speed operation of heat movement, and to prevent the reflection and diffusion member 8 from being broken because a temperature difference between a portion of the reflection and diffusion member 8 where the laser light impinges and a periphery thereof is reduced and equalized. Consequently, because the light can be always diffused, it is possible to provide a safe light source device without directly leaking the strong laser light to an exterior of the light source device.

Embodiment 4

Figure 8:
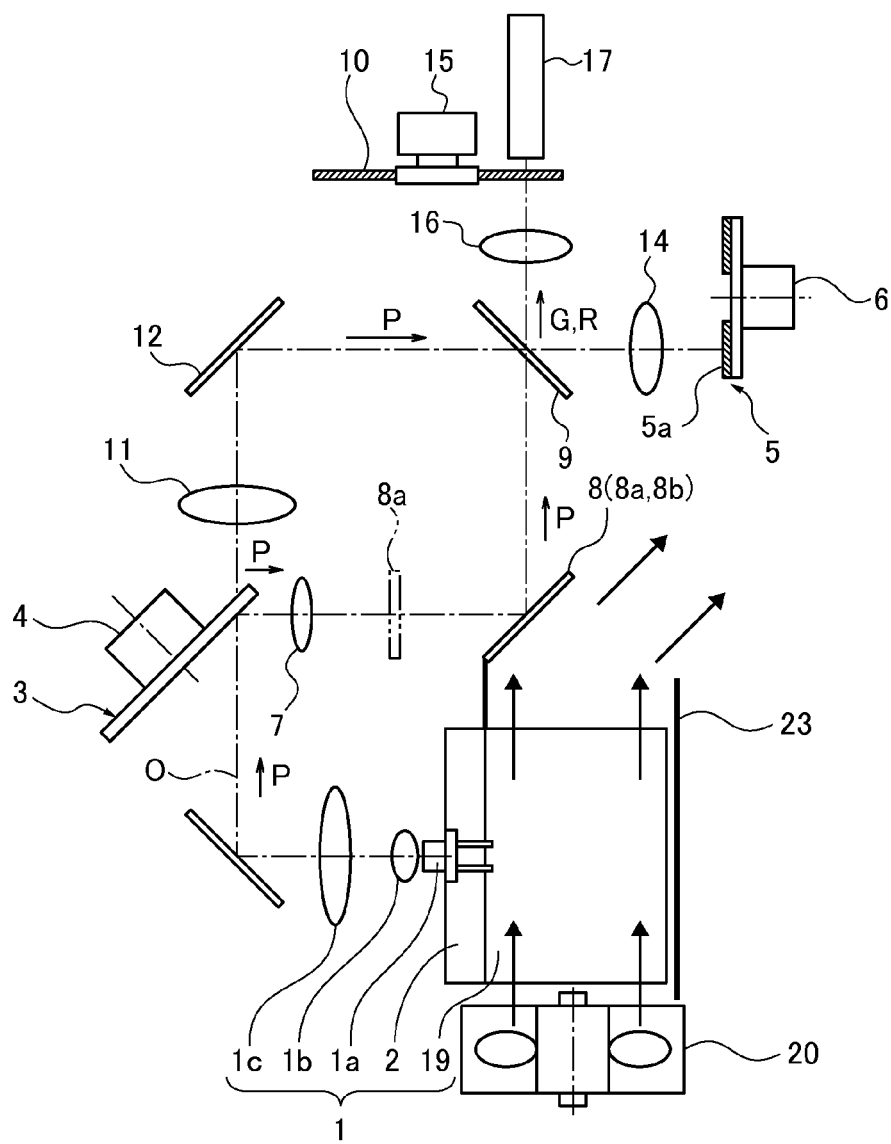
FIG. 8 is an optical diaphragm showing a main configuration of a light source device according to Embodiment 4 of the present invention.

FIG. 8 illustrates a light source device according to a fourth embodiment. A blower as one example in the fourth embodiment is connected to a flow channel forming section 23 that communicates the reflection and diffusion member 8 with the light source section 1 to feed the cooling air from either one of the light source section and the reflection and diffusion member to the other, or simultaneously. Note that, if the diffusion member 8a shown by double-dashed line in FIG. 8 is separately provided from the reflection member, the flow channel forming section 23 is connected to communicate the light source section 1 and the diffusion member 8a. In FIG. 8, identical reference numbers are attached to similar parts to the parts shown in FIG. 1, and a detailed description thereof is omitted.

In the fourth embodiment, the axial fan 20 is connected to a light source section side of the flow channel forming section 23 such that the axial fan 20 which is the blower feeds the cooling air from the light source section 1 to the reflection and diffusion member 8. In FIG. 8, arrows directing from the axial fan 20 to the heat sink 19 and the reflection and diffusion member 8 show directions of air. As an alternative, the axial fan 20 may be installed in a reflection and diffusion member side to form flow of the cooling air from the reflection and diffusion member 8 to the light source section 1. In addition, the axial fan 20 which is the blower may be connected at an intermediate portion of a flow channel between the reflection and diffusion member 8 and the light source section 1 to feed the cooling air to each of the light source section 1 and the reflection diffusion member 8 simultaneously.

The cooling air exhausted from the axial fan 20 is blown to the heat sink 19, and heat generated in the laser diode 1a is taken when the cooling air passes through the heat sink 19. Heat fluid exhausted from the heat sink 19 flows along the flow channel forming section 23 and is guided to the reflection and diffusion member 8. The heat fluid guided to the reflection and diffusion member 8 takes the heat generated in the reflection and diffusion member 8 and then is exhausted though an outlet provided close to the reflection and diffusion member 8 to an exterior of the light source device.

Here, a material or heat releasing surface area of the heat sink 19, air quantity of the axial fan 20 and son on are suitably set in accordance with heat quantity generated in the laser diode 1a such that the heat fluid exhausted from the heat sink 19 becomes a low temperature at which the reflection and diffusion member 8 is not damaged by heat. By optimally setting the heat sink 19 and the axial fan 20, a temperature of the heat fluid exhausted from the heat sink 19 is a lower temperature than a surface temperature of the reflection and diffusion member 8 to generate a large temperature difference therebetween, thereby allowing the reflection and diffusion member 8 to cool.

In this way, the linear arrangement of the laser diode 1a and the reflection and diffusion member 8 makes it possible to exhaust the heat generated in the laser diode 1a and the heat of the reflection and diffusion member 8 simultaneously by use of the single axial fan 20. In addition, the linear arrangement of the laser diode 1a and the reflection and diffusion member 8 makes it possible to reduce pressure loss on an air route to allow the heat fluid to exhaust efficiently. Further, the linear arrangement of the laser diode 1a and the reflection and diffusion member 8 makes it possible to cool the reflection and diffusion member 8 efficiently without increasing a cooling fan for exclusive use of the reflection and diffusion member 8. As a result, the reflection and diffusion member 8 can be prevented from being broken. As described above, because the light can be always diffused, it is possible to provide a safe light source device without leaking directly strong laser light to an exterior of the light source device.

Embodiment 5

Figure 9:
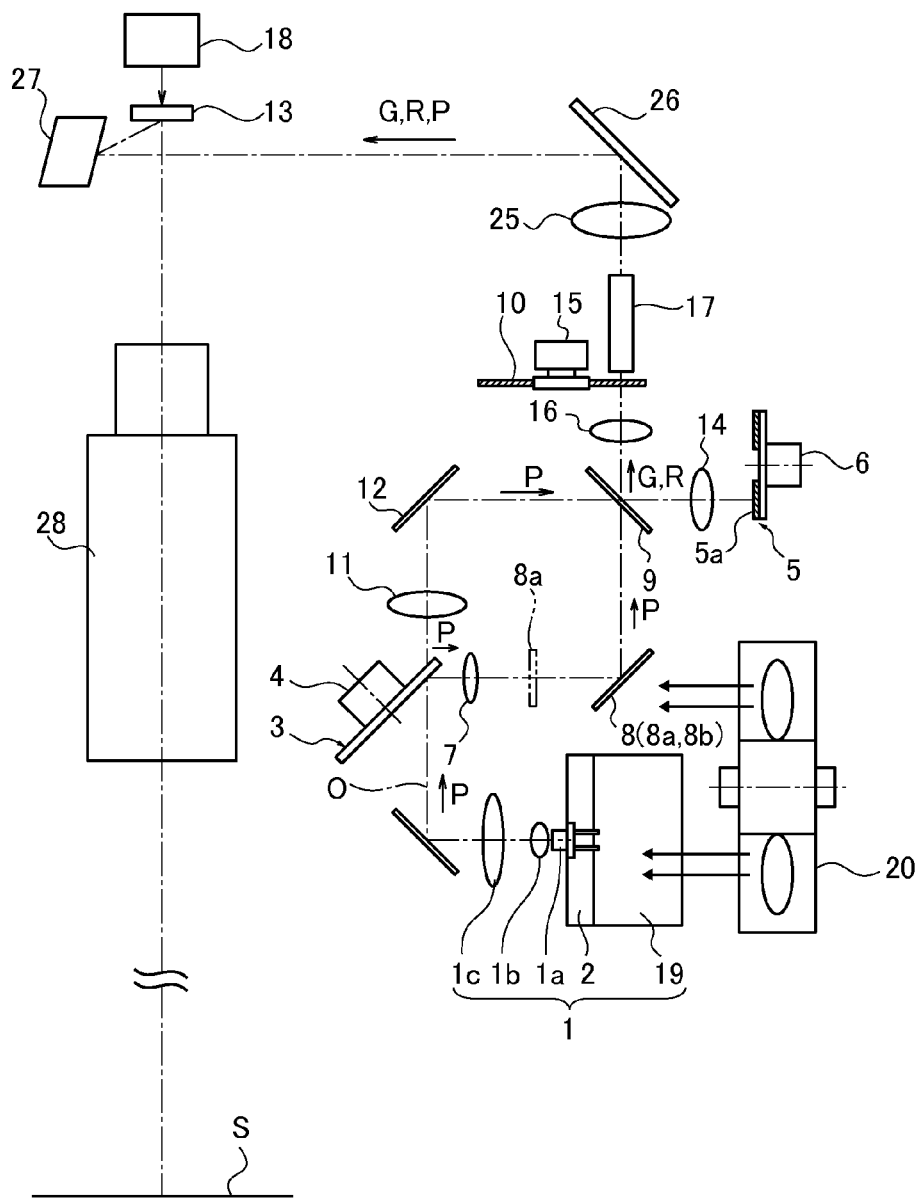
FIG. 9 is an optical diaphragm schematically showing one example of an image projector according to Embodiment 5 of the present invention.

FIG. 9 shows a fifth embodiment of the present invention and a schematic configuration of an image projector in which the light source device according to the first embodiment is installed. In FIG. 9, the same reference numbers as that attached to the components of the light source device shown in the first embodiment are attached to the light source device and a detailed description thereof is omitted.

The laser light P of blue (B) ingredient, the fluorescence G, and the fluorescence R which are guided to the light tunnel 17 of the light source device are condensed by a sixth condenser lens 25 to be a parallel luminous flux. Thereafter, the parallel luminous flux is guided to an image forming panel 13 (image generator) such as a known digital micro mirror device (DMD) through a light-path folding mirror 26 and a reflection mirror 27.

The image forming panel 13 is controlled by an image processor 18. Image data are input in the image processor 18, and a modulating signal is input in the digital micro mirror device (DMD) in according with the image data.

The digital micro mirror device 13 includes micro mirror display elements. Each of the micro mirror display elements is modulated in accordance with the image data, thereby the light of each color ingredient is reflected on the image forming panel 13 and is projected as image forming light on a screen S through a projecting lens system 28. As a result, a color image is enlargedly formed on the screen S. Note that, although the fifth embodiment have been described by use of a reflection-type image forming panel that forms an image in accordance with the modulating signal as the image forming panel 13, a transmission-type image forming panel may be used.

According to the image projector, the laser light P emitted from the light source device 1 is scattered on the fluorescence film 5a or diffused on the reflection and diffusion member 8 even if the laser light is not scattered on the fluorescence film 5a. Therefore, a trouble does not occur in safety of person's eye.

In addition, according to the image projector, because the laser diode 1a is cooled and the reflection and diffusion member 8 can be efficiently cooled simultaneously with the laser diode, it is possible to realize the decreases in size, cost and noise of the light source device. In other words, even if the laser light P emitted from the light source section 1 has a very high output, it is possible to reduce a temperature distribution difference in the reflection and diffusion member 8 by the cooler, suppress the generation of local heat stress, and prevent the reflection and diffusion member 8 from being damaged by heat cracking.

In this way, the reflection and diffusion member 8 is suitably cooled, thereby there is no fear of possibility of the damage of the reflection and diffusion member 8, and because the light can be always diffused, it is possible to provide continuously a safety image projector without leaking directly strong laser light to an exterior of the light source device.

According to the present invention, even if a reflection and diffusion member continues to be irradiated with laser light of a high output, it is possible to reduce heat quantity that the reflection and diffusion member receives and suppress the damage of the reflection and diffusion member by heat stress. Therefore, there is advantageous effect that the laser light of a high output can be prevented from leaking directly to an exterior of an image projector without being diffused.

Although the several embodiments of the present invention have been described, it should be noted that the present invention is not limited to these embodiments, various modifications and changes can be made to the embodiments by those skilled in the art as long as such modifications and changes are within the scope of the present invention as defined by the Claims.

What is claimed is:

1. A light source device comprising:
   a light source section configured to emit laser light;
   a reflection and diffusion member configured to diffuse and reflect at least a portion of the laser light emitted from the light source device;
   a phosphor wheel configured to receive at least a portion of the emitted laser light, and generate fluorescence based on the received laser light, the phosphor wheel being separate from the reflection and diffusion member; and
   a cooler configured to cool the reflection and diffusion member.

2. The light source device according to claim 1, wherein the reflection and diffusion member includes a reflection member and a diffusion member which are integrally formed, or separately arranged adjacent each other on a same optical axis.

3. The light source device according to claim 2, wherein the cooler is disposed to cool the diffusion member, directly.

4. The light source device according to claim 2, wherein the cooler is located on the reflection member.

5. The light source device according to claim 1, wherein the cooler includes at least one of an electronic cooling element, a heat pipe, and a blower.

6. The light source device according to claim 5, wherein the blower is configured to,
   feed cooling air from the light source section to the reflection and diffusion member,
   feed cooling air from to the reflection and diffusion member to the light source section, or
   feed cooling air to the light source section and the reflection and diffusion member, simultaneously.

7. The light source device according to claim 6, wherein the blower is connected to a flow channel forming section that communicates the light source section with the reflection and diffusion member.

8. An image projector comprising:
   the light source device claimed in claim 1;
   an image generator that is configured to,
   modulate the laser light diffused by and reflected on the reflection and diffusion member of the light source device, and
   form image forming light; and
   a projecting lens system configured to project the image forming light from the image generator.

9. The image projector according to claim 8, wherein the reflection and diffusion member includes a reflection member and a diffusion member which are integrally formed, or separately arranged adjacent each other on a same optical axis.

10. The image projector according to claim 9, wherein the cooler is disposed to cool the diffusion member directly.

11. The image projector according to claim 9, wherein the cooler is located on the reflection member.

12. The image projector according to claim 8, wherein the cooler includes at least one of an electronic cooling element, a heat pipe, and a blower.

13. The image projector according to claim 12, wherein the blower is configured to,
   feed cooling air from the light source section to the reflection and diffusion member,
   feed cooling air from to the reflection and diffusion member to the light source section, or
   feed cooling air to the light source section and the reflection and diffusion member, simultaneously.

14. The image projector according to claim 13, wherein the blower is connected to a flow channel forming section that communicates the light source section with the reflection and diffusion member.

15. The light source device of claim 1, wherein,
   the cooler is located on the reflection and diffusion member, and
   the cooler is an electronic cooling element or a heat pipe.

16. The image projector according to claim 9, wherein,
   the cooler is located on the reflection member, and
   the cooler is an electronic cooling element or a heat pipe.

* * * * *